US012140080B2

(12) United States Patent
Roberge

(10) Patent No.: US 12,140,080 B2
(45) Date of Patent: Nov. 12, 2024

(54) CONFORMAL ACCESSORY GEARBOX FOR LOW BYPASS GAS TURBINE ENGINE

(71) Applicant: Raytheon Technologies Corporation, Farmington, CT (US)

(72) Inventor: Gary D. Roberge, Tolland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/987,303

(22) Filed: Nov. 15, 2022

(65) Prior Publication Data

US 2023/0079778 A1  Mar. 16, 2023

Related U.S. Application Data

(63) Continuation of application No. 16/212,010, filed on Dec. 6, 2018, now Pat. No. 11,719,164.

(51) Int. Cl.
| F02C 7/32 | (2006.01) |
| F01D 25/16 | (2006.01) |
| F01D 25/24 | (2006.01) |
| B33Y 80/00 | (2015.01) |

(52) U.S. Cl.
CPC .............. *F02C 7/32* (2013.01); *F01D 25/162* (2013.01); *F01D 25/24* (2013.01); *B33Y 80/00* (2014.12); *F05D 2220/323* (2013.01)

(58) Field of Classification Search
CPC ............... F02C 7/32; F02C 7/36; F02C 25/24
See application file for complete search history.

(56) References Cited

U.S. PATENT DOCUMENTS

| 2,803,943 | A | * | 8/1957 | Horace | F02C 7/32 |
| | | | | | 60/262 |
| 2,978,869 | A | | 4/1961 | Hiscock et al. | |
| 3,608,910 | A | | 9/1971 | Tyler | |
| 4,525,995 | A | | 7/1985 | Clark | |
| 5,156,525 | A | | 10/1992 | Ciokajlo | |
| 8,042,341 | B2 | | 10/2011 | Charier et al. | |
| 8,192,143 | B2 | | 6/2012 | Suciu et al. | |
| 8,490,411 | B2 | | 7/2013 | Suciu et al. | |
| 8,511,967 | B2 | | 8/2013 | Suciu et al. | |
| 8,671,536 | B2 | | 3/2014 | Spanos et al. | |
| 9,091,214 | B2 | | 7/2015 | Cloft | |
| 9,689,314 | B2 | | 6/2017 | Lemarchand et al. | |
| 9,951,695 | B2 | | 4/2018 | Dobosz et al. | |
| 10,001,059 | B2 | | 6/2018 | Duong et al. | |
| 2010/0192351 | A1 | * | 8/2010 | Runnemalm | B21D 51/10 |
| | | | | | 29/428 |
| 2012/0159966 | A1 | * | 6/2012 | Suciu | F01D 25/18 |
| | | | | | 29/893.1 |
| 2013/0232788 | A1 | | 9/2013 | Spanos et al. | |

(Continued)

FOREIGN PATENT DOCUMENTS

| EP | 2636856 A2 | 9/2013 |
| EP | 3258084 A2 | 12/2017 |

(Continued)

*Primary Examiner* — Thuyhang N Nguyen
(74) *Attorney, Agent, or Firm* — Bachman & LaPointe, P.C.

(57) ABSTRACT

A gas turbine engine includes an engine case along an engine axis, a conformal accessory drive gearbox housing mounted to the engine case, and at least one accessory mounted to the conformal housing.

19 Claims, 7 Drawing Sheets

(56) References Cited

U.S. PATENT DOCUMENTS

| | | | |
|---|---|---|---|
| 2013/0247539 A1* | 9/2013 | Hoppe | F02C 7/32 60/39.15 |
| 2014/0090386 A1 | 4/2014 | Cloft et al. | |
| 2015/0300252 A1* | 10/2015 | Duong | F02C 7/32 29/888.01 |
| 2015/0343346 A1 | 12/2015 | Sheridan | |
| 2016/0010561 A1 | 1/2016 | Cloft et al. | |
| 2016/0138414 A1 | 5/2016 | Armange | |
| 2017/0122122 A1 | 5/2017 | Lepretre | |
| 2017/0356347 A1 | 12/2017 | Scothern et al. | |
| 2018/0283281 A1* | 10/2018 | Veilleux, Jr. | F02C 7/36 |
| 2018/0347471 A1 | 12/2018 | Wotzak | |
| 2019/0195139 A1 | 6/2019 | Roberge | |
| 2019/0218978 A1* | 7/2019 | Edwards | F02C 7/268 |

FOREIGN PATENT DOCUMENTS

| | | |
|---|---|---|
| EP | 3543511 A1 | 9/2019 |
| WO | 2014120134 A1 | 8/2014 |
| WO | 2015189522 A1 | 12/2015 |

* cited by examiner

CONFORMAL ACCESSORY GEARBOX FOR LOW BYPASS GAS TURBINE ENGINE

CROSS-REFERENCE TO RELATED APPLICATIONS

This application is a continuation of U.S. patent application Ser. No. 16/212,010, filed Dec. 6, 2018.

BACKGROUND

The present disclosure relates to a gas turbine engine, and more particularly to an accessory gearbox therefor.

Aircraft powered by gas turbine engines often include a mechanically driven accessory gearbox to drive accessory systems such as fuel pumps, scavenge pumps, electrical generators, hydraulic pumps, etc. These components typically operate at different speeds from one another and require differing amounts of horsepower as provided by the accessory gearbox.

Conventional gas turbine engine accessory gearboxes utilize a gearbox case mountable underneath the engine. The accessory gearbox is driven by an angle gearbox through a layshaft which axially extends from the gearbox case. A towershaft driven by the engine high-pressure spool drives the layshaft through the angle gearbox.

SUMMARY

A low bypass gas turbine engine according to one disclosed non-limiting embodiment of the present disclosure includes an engine case along an engine axis; a conformal accessory drive gearbox housing mounted to the engine case; and at least one accessory mounted to the conformal housing.

A further embodiment of any of the foregoing embodiments of the present disclosure includes that the at least one accessory has an axis of rotation transverse to the engine axis.

A further embodiment of any of the foregoing embodiments of the present disclosure includes a gear train within the conformal housing, the gear train powered by a towershaft, the gear train comprises an accessory drive shaft along an axis, the axis transverse to the engine axis.

A further embodiment of any of the foregoing embodiments of the present disclosure includes that the accessory drive shaft is supported upon bearings mounted in the conformal housing, the conformal housing having a removable cover to access at least one gear of the gear train.

A further embodiment of any of the foregoing embodiments of the present disclosure includes that the at least one accessory has an axis of rotation parallel to the engine axis.

A further embodiment of any of the foregoing embodiments of the present disclosure includes a gear train within the conformal housing, the gear train powered by a towershaft, the gear train comprises an accessory drive shaft along an axis, the axis parallel to the engine axis.

A further embodiment of any of the foregoing embodiments of the present disclosure includes that the accessory drive shaft is supported upon bearings mounted in the conformal housing.

A further embodiment of any of the foregoing embodiments of the present disclosure includes a shaft perpendicular to the accessory drive shaft.

A further embodiment of any of the foregoing embodiments of the present disclosure includes that the engine case is a fan duct case.

A further embodiment of any of the foregoing embodiments of the present disclosure includes that the engine case and the conformal accessory drive gearbox housing are additively manufactured.

A further embodiment of any of the foregoing embodiments of the present disclosure includes that the conformal accessory drive gearbox housing and the engine case comprise an isogrid outer surface.

A further embodiment of any of the foregoing embodiments of the present disclosure includes that the conformal accessory drive gearbox housing extends 100 degrees around the engine case.

A further embodiment of any of the foregoing embodiments of the present disclosure includes that the conformal accessory drive gearbox housing is located at a waist of the engine.

A further embodiment of any of the foregoing embodiments of the present disclosure includes a gear train within the conformal housing, the gear train powered by a towershaft that extends through a strut in the engine.

A further embodiment of any of the foregoing embodiments of the present disclosure includes that the towershaft is powered by a high pressure spool.

An additively manufactured gas turbine engine case assembly according to one disclosed non-limiting embodiment of the present disclosure includes a first engine case section; a second engine case section that mounts to the first engine case section along an axial interface along a plane running parallel to an engine axis; and a conformal accessory drive gearbox housing integrated with the second engine case.

A further embodiment of any of the foregoing embodiments of the present disclosure includes that the first engine case section and the second engine case section form a fan duct case.

A further embodiment of any of the foregoing embodiments of the present disclosure includes that the conformal accessory drive gearbox housing extends 100 degrees around the engine axis.

A further embodiment of any of the foregoing embodiments of the present disclosure includes a gear train within the conformal housing, the gear train powered by a towershaft.

A further embodiment of any of the foregoing embodiments of the present disclosure includes a towershaft to drive the gear train, the towershaft extends through a strut in the engine.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
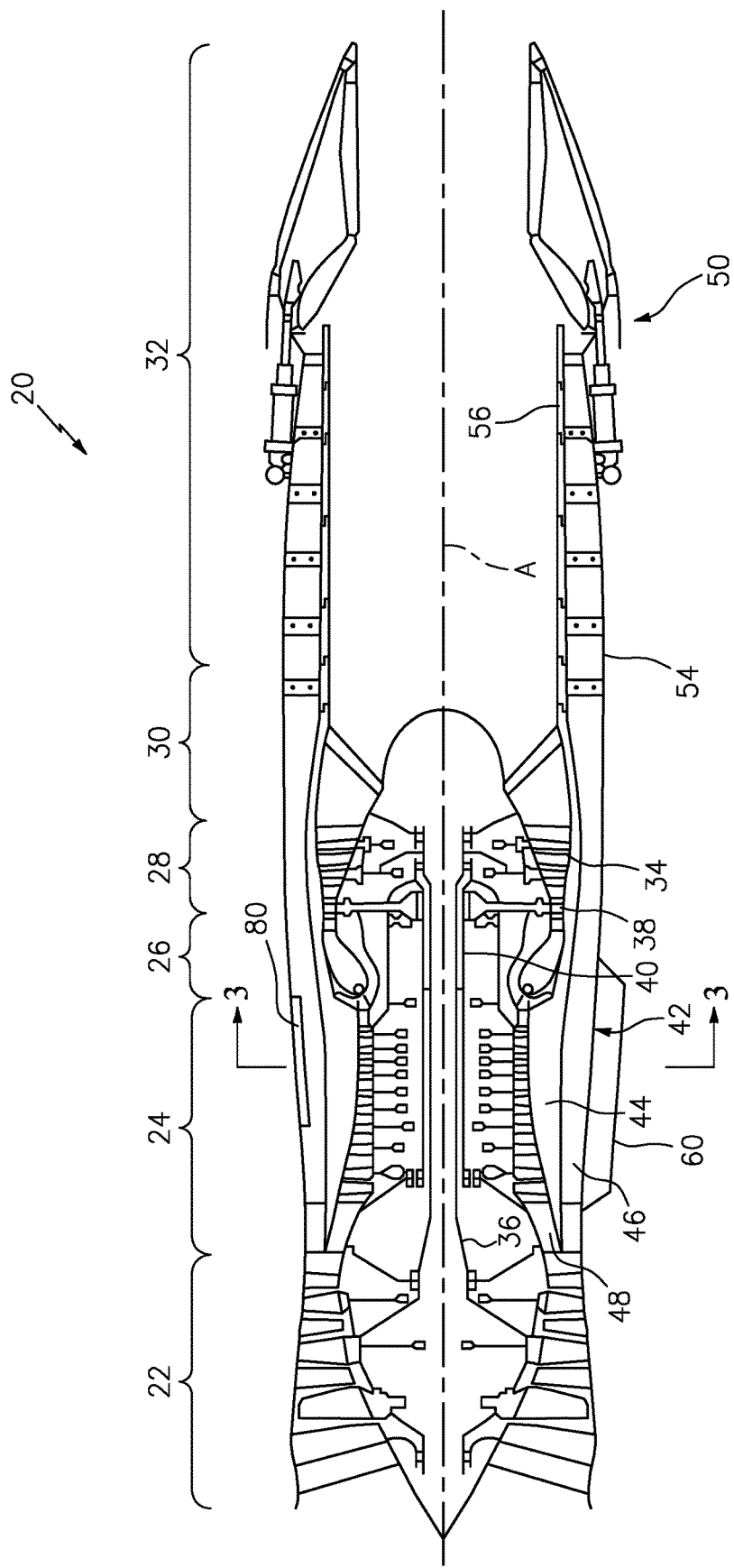
FIG. 1 is a schematic cross-section of a low bypass gas turbine engine.

FIG. 1 schematically illustrates a gas turbine engine 20. The gas turbine engine 20 is disclosed herein as a two-spool low bypass turbofan that generally incorporates a fan section 22, a compressor section 24, a combustor section 26, a turbine section 28, an augmenter section 30, and a nozzle section 32 along a central longitudinal engine axis A. The bypass ratio (BPR) of a turbofan engine is the ratio between the mass flow rate of the bypass stream to the mass flow rate entering the core. The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer fan duct engine structure 42 and an optional inner engine duct structure 44 define a generally annular secondary airflow path 46 around a primary airflow path 48. Depending on the bypass ratio of the engine under consideration, bypass flow in annular flowpath 46 may be defined by the outer fan duct 42 and outer case of compressor 24. It should be appreciated that various structures may define the outer engine structure 42 and the inner engine structure 44 which essentially define an exoskeleton to support the core engine therein. Air that enters the fan section 22 is divided between a core flow through the primary airflow path 48 and a secondary airflow through the secondary airflow path 46 which can be referred to as a bypass flow of low bypass ratio architecture. Although depicted as an augmented low bypass gas turbine engine (e.g., BPR cross-section 0.2-2.5) in the disclosed non-limiting embodiment, it should be appreciated that the concepts described herein are applicable to other gas turbine engine architectures.

The core flow then passes through the combustor section 26, the turbine section 28, then the augmentor section 30 where fuel may be selectively injected and burned to generate additional thrust through the nozzle section 32. The secondary bypass airflow may be utilized for a multiple of purposes to include, for example, cooling and pressurization. The secondary airflow as defined herein is any flow different than the primary combustion gas exhaust airflow. The secondary airflow passes through an annulus defined by the outer engine structure 42 and the inner engine structure 44, then may be at least partially injected into the primary airflow path 48 adjacent the augmentor section 30 and the nozzle section 32.

Figure 2:
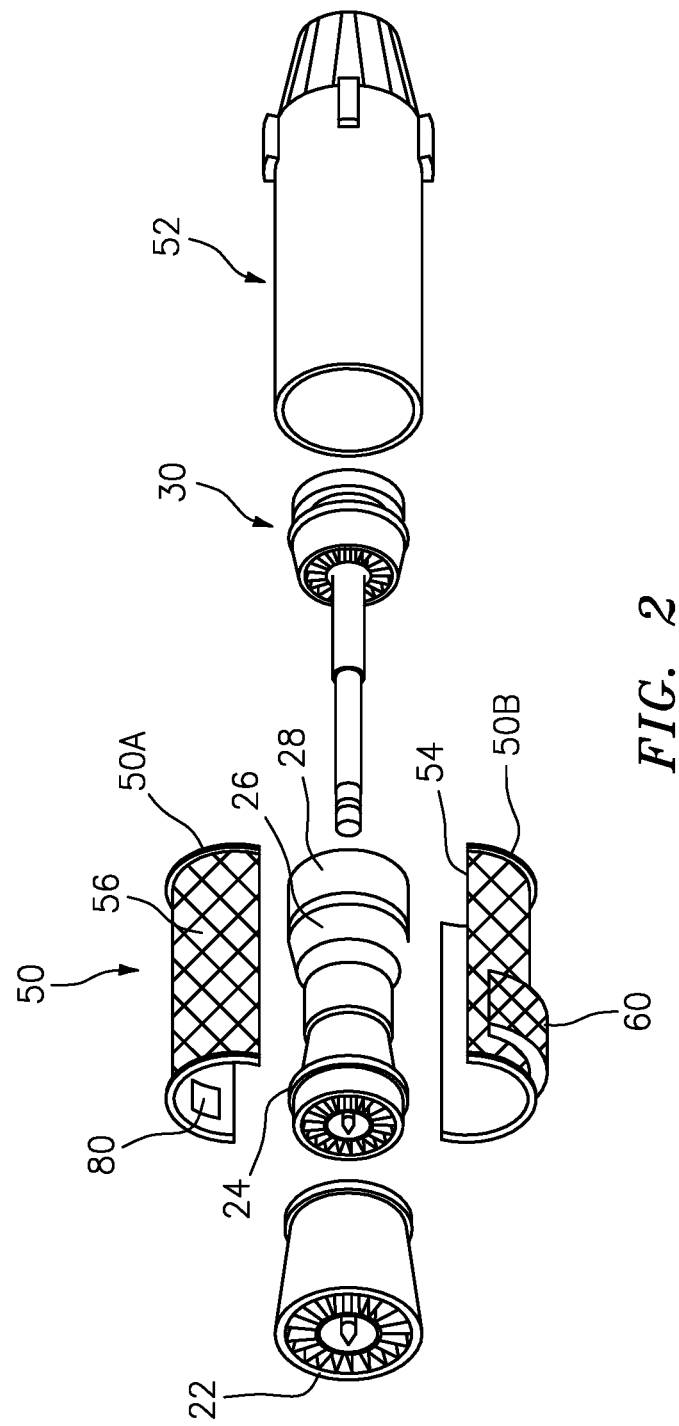
FIG. 2 is an exploded view of the low bypass gas turbine engine.

With reference to FIG. 2, the engine 20 generally includes sub-structures or modules, defined by, for example, the fan section 22, the forward fan duct assembly 50, and an exhaust duct assembly 52. The inner engine structure 44 may include a center body with a tail cone. The exhaust duct assembly 52 may include an outer case 54 and a concentrically spaced inner liner 56 that operates as a heat shield to protect the outer case 54 from the exhaust gas flow. Air discharged from the fan section 22 is communicated through the secondary airflow path 46 which may be defined in part by the outer case 54 and the inner liner 56. Circumferentially arrayed augmentor vanes 58 extend generally radially between the center body and the exhaust duct assembly 52.

The forward fan duct assembly 50, in the illustrated embodiment, is split into two fan duct sections 50A, 50B (FIG. 2) along an axial interface 54 along a plane running parallel to the centerline A to facilitate assembly, inspection, and maintenance of core components. Alternatively, the fan duct assembly 50 may be a singular full-hoop structure or split into more than two segments. In the depicted embodiment, the first section 50A of the fan duct assembly 50 may be an upper half and the second section 50B may be a lower half. The fan duct assembly 50 may be formed with an isogrid outer surface 56 to increase strength and cross-sectional moment of inertia in a structurally efficient manner and decrease weight thereof. An isogrid is typically a type of partially hollowed-out structure formed usually from a single metal plate (or face sheet) with triangular integral stiffening ribs (often called stringers).

A conformal accessory drive gearbox system 60 is axially mounted to the forward fan duct assembly 50 along an accessory gearbox axis L generally parallel to the engine axis of rotation A. The conformal accessory drive gearbox system 60 supports accessory components (ACs) such as, for example, an air turbine starter, a de-oiler, a hydraulic pump, a engine lubrication pump, an integrated drive generator, a permanent magnet alternator, a fuel pump module, and others. Each accessory component typically has an input shaft that defines an axis of rotation. It should be appreciated, that any number and type of accessory components AC may alternatively or additionally be provided.

Figure 3:
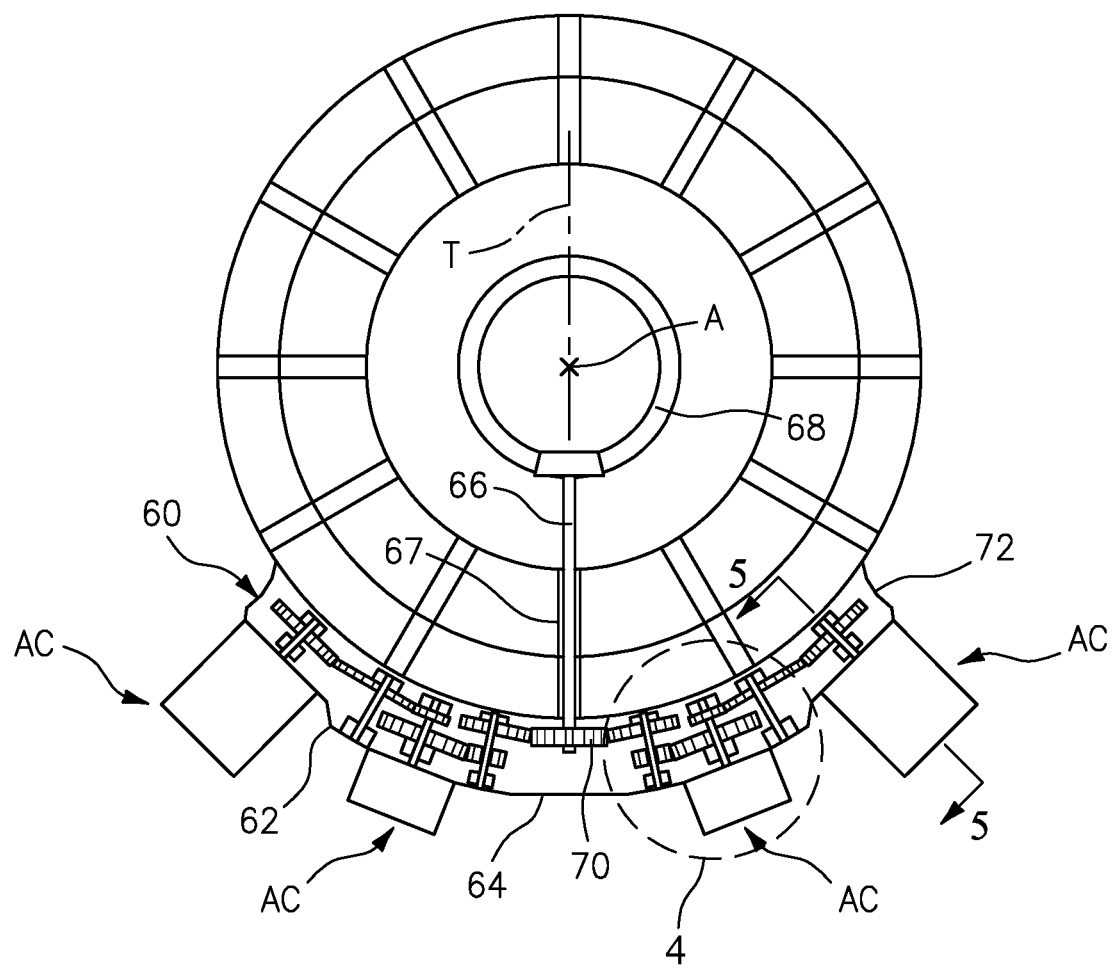
FIG. 3 is cross-section of the gas turbine engine illustrating a conformal accessory system.

With reference to FIG. 3, the conformal accessory drive gearbox system 60 includes a conformal accessory drive gearbox housing 62 with a removable cover 64. Although the conformal accessory drive gearbox housing 62 in the illustrated embodiment is shown on the bottom of the engine, other circumferential locations are possible. A towershaft 66 that passes through an engine strut 67 is engaged via gears with a high spool 68 in the vicinity of the compressor section 24. The towershaft 66 defines a towershaft axis of rotation T generally transverse to the engine axis of rotation A.

The conformal accessory drive gearbox housing 62 conforms to an outer diameter of the engine 20 and spans over an arc, in one embodiment, of 100 degrees of the engine's circumference. The conformal accessory drive gearbox housing 62 may be located at a waist of the engine 20 which is the smallest diameter of the engine 20 and generally located just forward of the compressor section 24 (FIG. 1). Alternatively, the conformal accessory drive gearbox system 60 is at least partially formed by the forward fan duct assembly 50 and is integrated therewith (FIG. 2). In this embodiment, the conformal accessory drive gearbox housing 62 is at least partially integrated into the fan duct section 50B. That is, at least a portion of fan duct section 50B and the conformal accessory drive gearbox housing 62 are additively manufactured such that the conformal accessory drive gearbox housing 62 is integrated into the fan duct sections 50B as a single component via additive manufacturing. In other embodiments the conformal accessory drive gearbox housing 62 may be largely integrated with the fan duct section 50B allowing for one or more additional housing elements to be mechanically attached to facilitate assembly.

The additive manufacturing process sequentially builds-up layers of materials material that include but are not limited to, various titanium alloys including Ti 6-4, Inconel 625 Alloy, Inconel 718 Alloy, Haynes230 Alloy, stainless steel, tool steel, cobalt chrome, titanium, nickel, aluminum, ceramics, plastics and others in atomized powder material form. In other examples, the starting materials can be non-atomized powders, filled or unfilled resins in liquid, solid or semisolid forms, and wire-based approaches such as wire arc for metals and Fused Deposition Modeling (FDM) for polymers. Alloys such as Inconel 625, Inconel 718 and Haynes 230 may have specific benefit for high temperature environments, such as, for example, environments typically encountered by aerospace and gas turbine engine articles. Examples of the additive manufacturing processes include, but are not limited to, SFF processes, 3-D printing methods, Sanders Modelmaker, Selective Laser Sintering (SLS), 3D systems thermojet, ZCorp 3D printing Binder jetting, Extrude ProMetal 3D printing, stereolithography, Layered Object Manufacturing (LOM), Fused Deposition Modeling (FDDM), Electron Beam Sintering (EBS), Direct Metal Laser Sintering (DMLS), Electron Beam Melting (EBM), Electron Beam Powder Bed Fusion (EB-PBF), Electron Beam Powder Wire (EBW), Laser Engineered Net Shaping (LENS), Laser Net Shape Manufacturing (LNSM), Direct Metal Deposition (DMD), Laser Powder Bed Fusion (L-PBF), Digital Light Synthesis, and Continuous Liquid Interface Production (CLIP). Although particular additive manufacturing processes are recited, any rapid manufacturing method can alternatively or additionally be used. In addition, while additive manufacturing is the envisioned approach for fabrication of the conformal accessory drive gearbox housing 62, alternate embodiments may utilize alternate manufacturing approaches including cast, brazed, welded or diffusion bonded structures.

Figure 4:
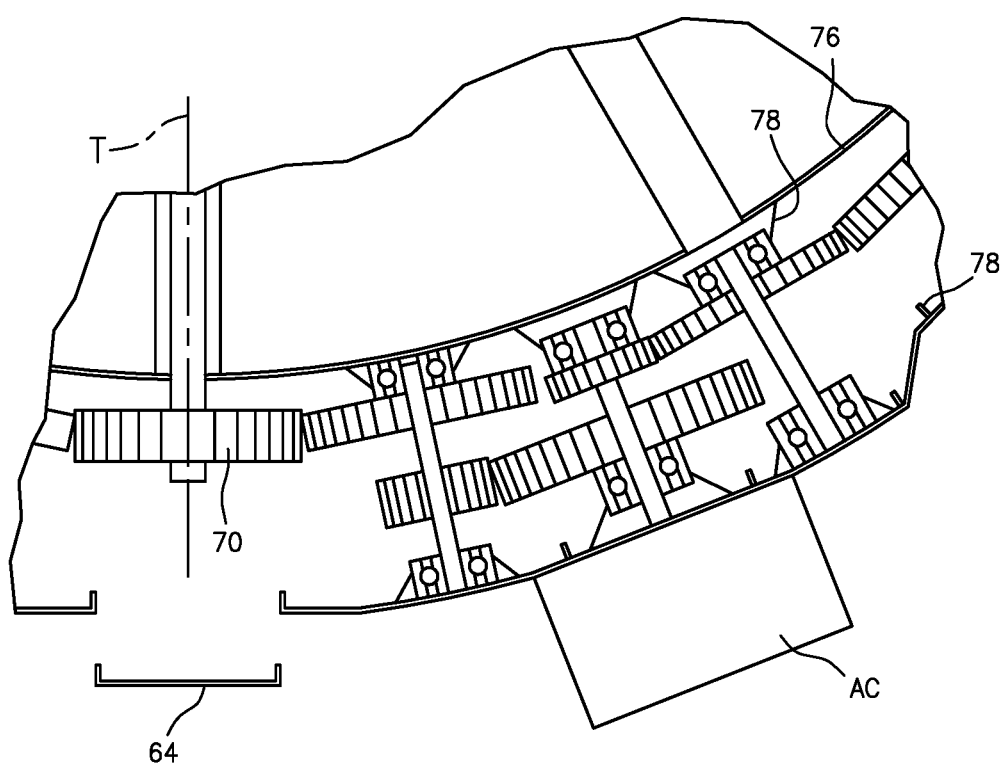
FIG. 4 is an expanded cross-section of the conformal accessory drive gearbox system with a radially arranged accessory component according to one embodiment.

The removable cover 64 (FIG. 4) may be located opposite a lower towershaft bevel gear 70 that drives an accessory gear train 72 contained and supported within the conformal accessory drive gearbox housing 62. The removable cover 64 provides access to the towershaft 66 and may also provide access for installation or assembly of associated internal components including gears and bearings. The accessory gear train 72, in one embodiment, includes a polygonal transmission with associated gears and supporting bearings to provide the required component input speed and power. As the conformal accessory drive gearbox housing 62 is additive manufactured, oil supply and scavenge lines 76 (illustrated schematically), oil baffles 77 (illustrated schematically), bearing support structures 78, and other features are readily integrated (FIG. 4).

Figure 5:
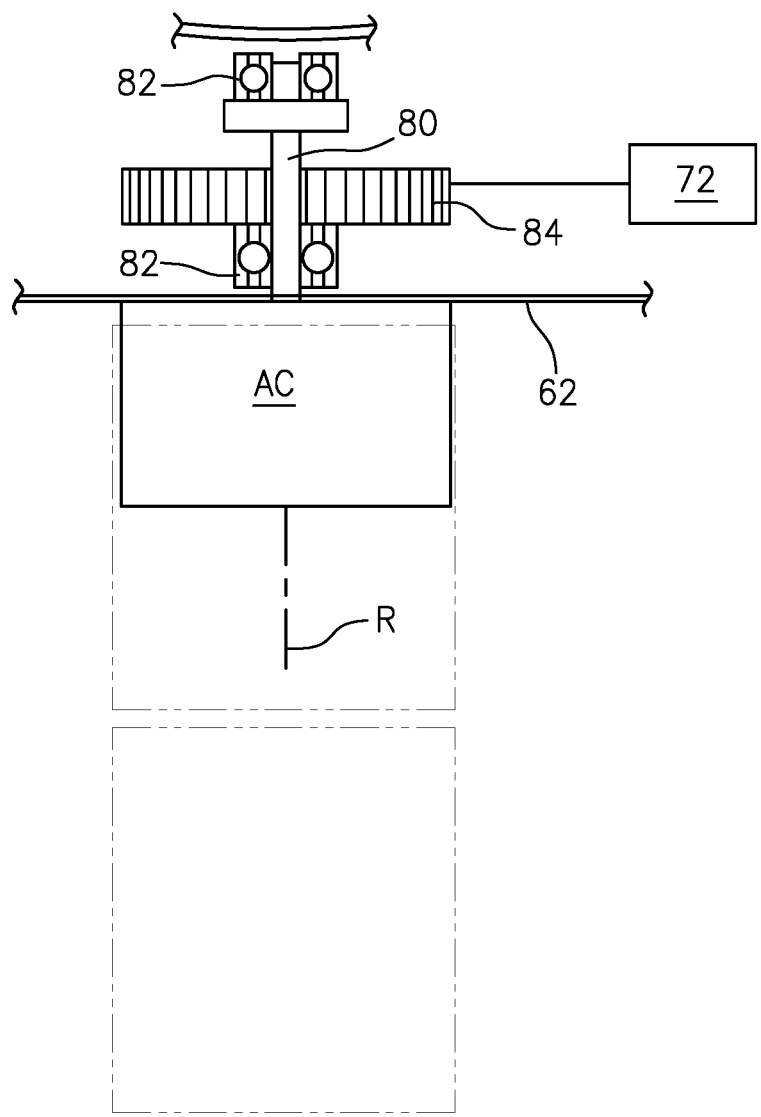
FIG. 5 is a cross-section of the gas turbine engine with radially arranged accessory components.
Figure 6:
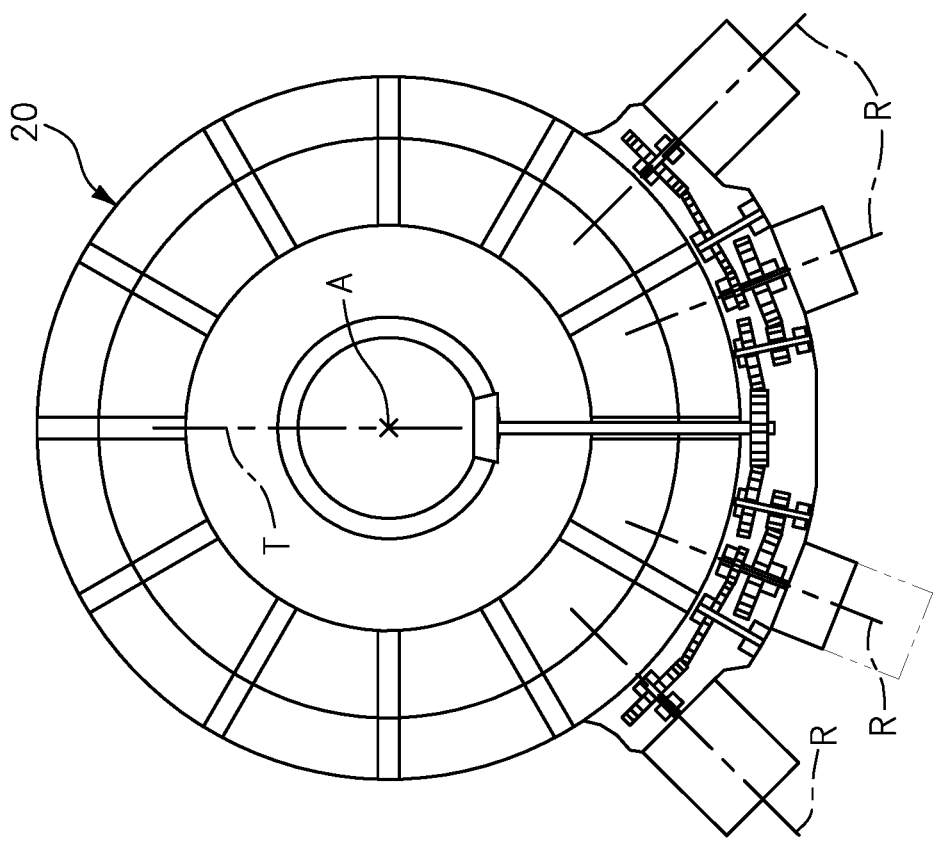
FIG. 6 is an expanded cross-section of the conformal accessory drive gearbox system with an axially arranged accessory component according to another embodiment.

With reference to FIG. 5, in one embodiment, the accessory gear train 72 is arranged to orient the accessories radially along one or more respective radial axes R (FIG. 6). In this embodiment, each accessory may include an accessory drive shaft 80 along each of the individual axis R and supported upon bearings 82 mounted in the conformal accessory drive gearbox housing 62. One or more gears 84 drive the associated accessory and/or transmit power to an associated accessory drive shaft from the gear train 72.

Figure 8:
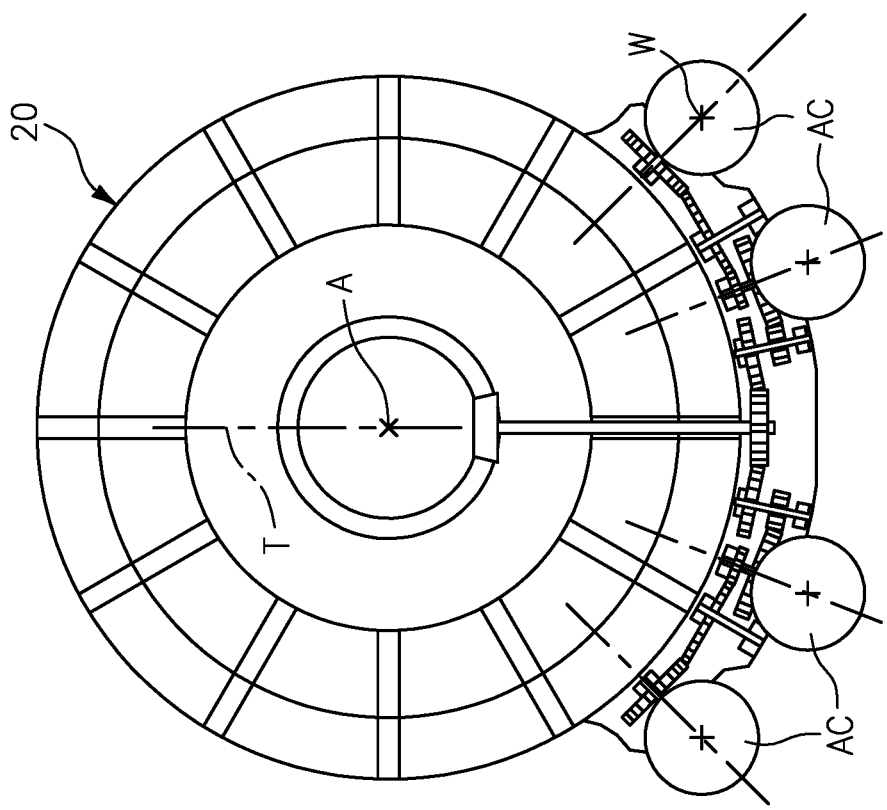
FIG. 8 is an expanded cross-section of the conformal accessory drive gearbox system with radially arranged accessory component according to another embodiment.
Figure 7:
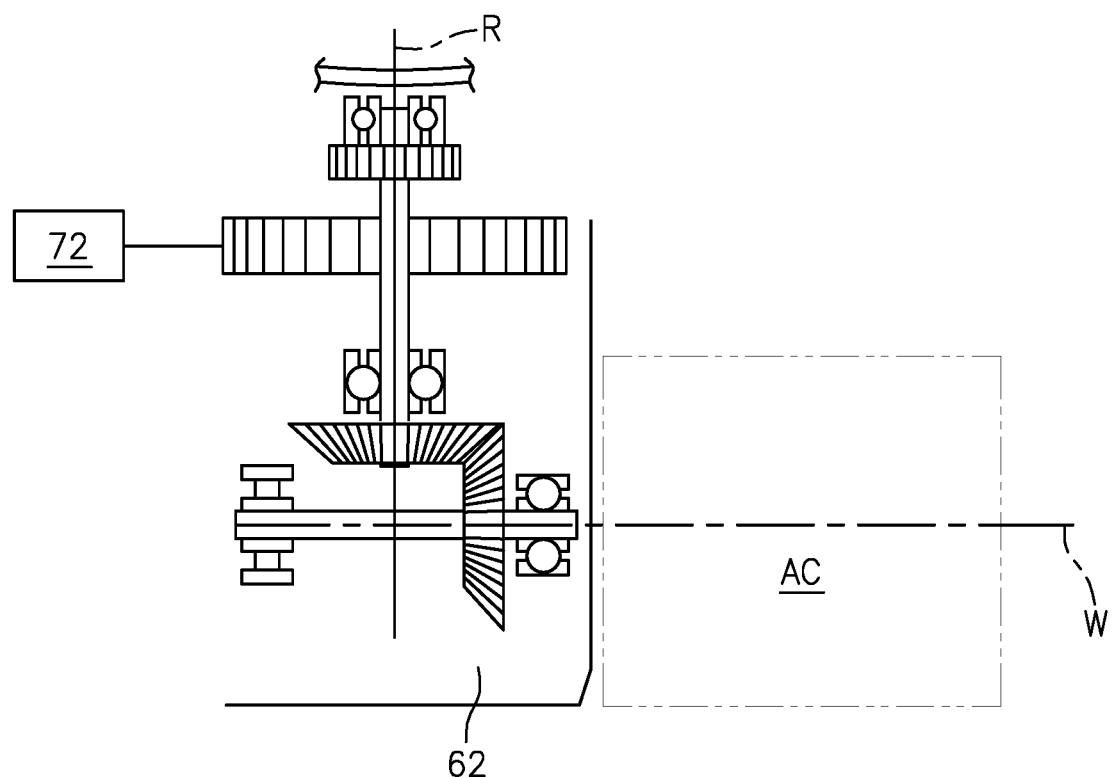
FIG. 7 is a cross-section of the gas turbine engine with axially arranged accessory components.

With reference to FIG. 7, in another embodiment, the accessory gear train 72 is arranged to orient the accessories axially along one or more respective axis W that is parallel to the engine axis A (FIG. 8). In this embodiment one or more accessory may include an accessory drive shaft 90 along each of the individual axis W supported upon bearings 92 mounted in the conformal accessory drive gearbox housing 62. The accessory drive shaft 90 includes a right-angle drive gear 94 that is driven by a right-angle drive gear 96 on an accessory drive shaft 96 along an axis T supported upon bearings 100 mounted in the conformal accessory drive gearbox housing 62. One or more gears 102 drive the associated accessory and/or transmit power to an associated accessory drive shaft.

This integration mounts accessories close to the engine case to reduce the mounting envelope of the engine which may be particular advantageous for various airframe architectures. The conformal accessory drive gearbox system reduces component complexity, part count, and weight through elimination of bolted flanges and additional structure typical of a separate angled gearbox housing. It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A low bypass gas turbine engine, comprising:
    a fan including a plurality of fan stages;
    an engine case along an engine axis, wherein the engine case is a fan duct case;
    a core engine including a compressor, a combustor, and a turbine, wherein the core engine is positioned downstream of the fan and defines a primary airflow path,
    the fan duct case defines a secondary airflow path, wherein the secondary airflow path is radially outward and surrounding the primary airflow path;
    a conformal accessory drive gearbox housing mounted on a radially outer side to the engine case, such that the conformal housing extends to contact to be integral with the engine case; and
    at least one accessory mounted to the conformal housing, wherein the engine case defines a cylindrical structure having an outer wall surface curved around a longitudinal axis of the engine case, and wherein the conformal accessory drive gearbox housing has a radially outer surface relative to the longitudinal axis, and the radially outer surface is conformal with the outer wall surface of the engine case,
    wherein the conformal housing is positioned axially downstream of the fan and radially aligned with the compressor along the engine axis.

2. The low bypass gas turbine engine as recited in claim 1, wherein the at least one accessory has an axis of rotation transverse to the engine axis.

3. The low bypass gas turbine engine as recited in claim 2, further comprising a gear train within the conformal housing, the gear train powered by a towershaft, the gear train comprises an accessory drive shaft along an axis, the axis transverse to the engine axis.

4. The low bypass gas turbine engine as recited in claim 3, wherein the accessory drive shaft is supported upon bearings mounted in the conformal housing, the conformal housing comprising a removable cover to access at least one gear of the gear train.

5. The low bypass gas turbine engine as recited in claim 1, wherein the at least one accessory has an axis of rotation parallel to the engine axis.

6. The low bypass gas turbine engine as recited in claim 5, further comprising a gear train within the conformal housing, the gear train powered by a towershaft, the gear train comprises an accessory drive shaft along an axis, the axis parallel to the engine axis.

7. The low bypass gas turbine engine as recited in claim 6, wherein the accessory drive shaft is supported upon bearings mounted in the conformal housing.

8. The low bypass gas turbine engine as recited in claim 7, further comprising a shaft perpendicular to the accessory drive shaft.

9. The low bypass gas turbine engine as recited in claim 1, wherein the engine case and the conformal accessory drive gearbox housing are additively manufactured.

10. The low bypass gas turbine engine as recited in claim 9, wherein the conformal accessory drive gearbox housing and the engine case comprise an isogrid outer surface.

11. The low bypass gas turbine engine as recited in claim 1, wherein the conformal accessory drive gearbox housing extends 100 degrees around the engine case, and wherein the conformal accessory drive gearbox housing has a circumferential dimension and a radial dimension, and wherein the radial dimension is smaller than the circumferential dimension.

12. The low bypass gas turbine engine as recited in claim 1, wherein the conformal accessory drive gearbox housing is located at a waist of the engine.

13. The low bypass gas turbine engine as recited in claim 1, further comprising a gear train within the conformal housing, the gear train powered by a towershaft that extends through a strut in the engine.

14. The low bypass gas turbine engine as recited in claim 13, wherein the towershaft is powered by a high pressure spool.

15. An additively manufactured gas turbine engine case assembly, comprising:
- a first engine case section enclosing a core engine, the core engine including a compressor, a combustor, and a turbine, wherein the core engine defines a primary airflow path;
- a second engine case section enclosing a fan upstream of the core engine, the fan including a plurality of fan stages,
- wherein the fan defines a secondary airflow path, such that the secondary airflow path is radially outward and surrounding the primary airflow path,
- the second engine case section mounts to the first engine case section along an axial interface along a plane running parallel to an engine axis; and
- a conformal accessory drive gearbox housing integrated with the second engine case, on a radially outer side to the second engine case, such that the conformal housing extends to contact to be integral with the second engine case,
- wherein the conformal housing is positioned axially downstream of the fan and radially aligned with the compressor along the engine axis.

16. The additively manufactured gas turbine engine case assembly as recited in claim 15, wherein the first engine case section and the second engine case section form a fan duct case.

17. The additively manufactured gas turbine engine case assembly as recited in claim 15, wherein the conformal accessory drive gearbox housing extends 100 degrees around the engine axis.

18. The additively manufactured gas turbine engine case assembly as recited in claim 17, further comprising a gear train within the conformal housing, the gear train powered by a towershaft.

19. The additively manufactured gas turbine engine case assembly as recited in claim 18, wherein the towershaft extends through a strut in the engine.

* * * * *